US008588309B2

(12) United States Patent
Doepke

(10) Patent No.: US 8,588,309 B2
(45) Date of Patent: Nov. 19, 2013

(54) SKIN TONE AND FEATURE DETECTION FOR VIDEO CONFERENCING COMPRESSION

(75) Inventor: Frank Doepke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 802 days.

(21) Appl. No.: 12/755,551

(22) Filed: Apr. 7, 2010

(65) Prior Publication Data

US 2011/0249756 A1 Oct. 13, 2011

(51) Int. Cl.
*H04N 7/12* (2006.01)
*H04N 11/02* (2006.01)
*H04N 11/04* (2006.01)

(52) U.S. Cl.
USPC .................................................. 375/240.24

(58) Field of Classification Search
CPC . H04N 1/628; H04N 7/2609; H04N 7/26127; H04N 7/26196
USPC .................................................. 375/240.24
See application file for complete search history.

(56) References Cited

U.S. PATENT DOCUMENTS

| | | | |
|---|---|---|---|
| 6,275,614 B1 * | 8/2001 | Krishnamurthy et al. | .... 382/224 |
| 6,408,101 B1 | 6/2002 | Krishnamurthy et al. | |
| 6,456,328 B1 * | 9/2002 | Okada | ........................... 348/699 |
| 7,020,337 B2 | 3/2006 | Viola et al. | |
| 7,031,499 B2 | 4/2006 | Viola et al. | |
| 7,099,510 B2 | 8/2006 | Jones et al. | |
| 7,113,203 B1 | 9/2006 | Wu et al. | |
| 7,197,186 B2 | 3/2007 | Jones et al. | |
| 7,426,296 B2 | 9/2008 | Lee et al. | |
| 7,639,849 B2 * | 12/2009 | Kimpe et al. | ................. 382/128 |
| 2003/0123751 A1 * | 7/2003 | Krishnamurthy et al. | .... 382/282 |
| 2004/0125877 A1 | 7/2004 | Chang et al. | |
| 2005/0207643 A1 | 9/2005 | Lee et al. | |
| 2006/0257048 A1 | 11/2006 | Lin et al. | |
| 2008/0240237 A1 | 10/2008 | Tian et al. | |
| 2009/0097543 A1 * | 4/2009 | Pan et al. | ................... 375/240.1 |

(Continued)

FOREIGN PATENT DOCUMENTS

WO   0000932    1/2000
WO   2008038214 4/2008

OTHER PUBLICATIONS

Viola, et al., "Robust Real-Time Face Detection", International Journal of Computer Vision 57(2), pp. 137-154 (May 2004).

(Continued)

*Primary Examiner* — Mehrdad Dastouri
*Assistant Examiner* — Jeremaiah C Hallenbeck-Huber
(74) *Attorney, Agent, or Firm* — Kenyon & Kenyon LLP

(57) ABSTRACT

In many videoconferencing applications, bandwidth is at a premium, and thus, it is important to encode a given video frame intelligently. It is often desirable that a larger amount of information be spent encoding the more important parts of the video frame, e.g., human facial features, whereas the less important parts of the video frame can be compressed at higher rates. Thus, there is need for an apparatus, computer readable medium, processor, and method for intelligent skin tone and facial feature aware videoconferencing compression that can "suggest" intelligent macroblock compression ratios to a video encoder. The suggestion of compression rates can be based at least in part on a determination of which macroblocks in a given video frame are likely to contain skin tones, likely to contain features (e.g., edges), likely to contain features in or near skin tone regions, or likely to contain neither skin tones nor features.

25 Claims, 11 Drawing Sheets

(56) References Cited

U.S. PATENT DOCUMENTS

| | | | |
|---|---|---|---|
| 2009/0110063 A1* | 4/2009 | Nakayama | 375/240.03 |
| 2009/0148058 A1 | 6/2009 | Dane et al. | |
| 2010/0033633 A1* | 2/2010 | Dane et al. | 348/625 |
| 2010/0135590 A1* | 6/2010 | Yang et al. | 382/250 |
| 2010/0322300 A1* | 12/2010 | Li et al. | 375/240.01 |

OTHER PUBLICATIONS

Rowley, et al., "Neural Network-Based Face Detection", IEEE Transactions on Pattern Analysis and Machine Intelligence, 20(1), pp. 23-38 (Jan. 1998).

Schneiderman, et al., "A Statistical Method for 3D Object Detection Applied to Faces and Cars", IEEE Conference on Computer Vision and Pattern Recognition (CVPR 2000).

Khan, et al., "Adaptive Video Encoding based on Skin Tone Region Detection", IEEE Students Conference ISCON 2002, pp. 129-134, (Aug. 2002).

International Search Report. PCT/US2010/049828. Dec. 23, 2010.

Farrukh, Ayesha et al. "Automated Segmentation of Skin-Tone Regions in Video Sequences." IEEE. 2002. pp. 122-128.

Yang, Ming-Hsuan et al. "Detecting Faces in Images: A Survey." IEEE Transactions on Pattern Analysis and Machine Intelligence. vol. 24. No. 1. Jan. 2002.

* cited by examiner

SKIN TONE AND FEATURE DETECTION FOR VIDEO CONFERENCING COMPRESSION

BACKGROUND

In many videoconferencing applications, bandwidth is at a premium, and thus, it is important to encode a given video frame—as well as the entire video stream—as efficiently and intelligently as possible. Video compression algorithms typically operate on macroblocks of data, that is, square-shaped groups of neighboring pixels within the video frame. Macroblocks are typically 16 pixels by 16 pixels in size, but, depending on the codec used to encode the video data, e.g., H.263 or H.264, the frame may also be broken down into smaller macroblocks, e.g., macroblocks that are 4, 8, 12, or 16 pixels to a side in size. Of course, the video frame may also be broken down into smaller or larger macroblocks of any size.

In videoconferencing applications, it is paramount to ensure the highest possible video quality at the lowest possible bit rate. Existing video codec standards today employ both inter-coding and intra-coding techniques. Intra-coding techniques are performed relative to information that is contained only within the current video frame and not relative to any other frame in the video sequence. Intra-coding takes advantage of the fact that the human eye does not perceive very small differences in color as easily as it can perceive changes in brightness. Inter-coding techniques, on the other hand, involve temporal processing, that is, rather than resending all the information for a subsequent video frame, the codec will only encode and send the changes in pixel location and pixel values from one video frame to the next video frame. This is an effective technique because, often, a large number of the pixels will not change from one video frame to the next, and it would be redundant to resend all the image information with each video frame.

During encoding, video compression codecs have to make critical decisions regarding where to "spend" their limited number of bits for each video frame, i.e., the codec must determine upon which macroblocks the most amount of image detail is needed. It is often desirable that a larger amount of information be spent encoding the most important parts of the video frame, whereas the less important parts of the video frame can be compressed at higher rates and still produce satisfactory video quality. In videoconferencing applications in particular, the most important parts of the video frame are usually where the human face or hands are located in the video frame and, more specifically, where the facial features involved in communication, such as the eyes and mouth, are located.

Thus, there is need for an apparatus, computer readable medium, processor, and method for intelligent skin tone and facial feature aware videoconferencing compression that can "suggest" macroblock compression ratios to the video encoder. The suggestion of compression rates can be based at least in part on which macroblocks in a given video frame are likely to be the most important, and thus deserving of having a disproportionately greater number of bits spent in their encoding than in the encoding of the less important macroblocks in the video frame.

SUMMARY

Prior art videoconferencing compression methods disclose locating faces within a given video frame by examining each of the macroblocks in the video frame and determining the number of pixels within the macroblock that fall within a predetermined skin tone color region. If the macroblock contains above a threshold number of skin tone pixels, the macroblock can be compressed at a lower rate since it likely contains important information, e.g., a human face. Conversely, if a given macroblock does not contain a threshold number of skin tone pixels, prior art videoconferencing compression methods have treated the macroblock as less important and compressed it at a higher rate. Compression schemes based solely on skin tone detection may result in undesirable video streams, wherein the outer edges of human faces are highly compressed (and thus lacking in quality) when the outer edges of a face cover only a small portion of a given macroblock, thus causing the algorithm to deem that macroblock not "skin tone enough" to merit a lower compression ratio. Further, prior art videoconferencing compression methods would be likely to spend unnecessarily large amounts of information encoding regions of skin tone within the video frame that don't actually possess many details or features, e.g., foreheads and cheeks.

This disclosure pertains to an apparatus, computer readable medium, processor, and method for more intelligent video compression that takes into account both skin tone and feature detection. For example, in one embodiment, each pixel in a macroblock is given a weighted value based on whether the pixel is: a.) within a skin tone region (e.g., a value of '1'); b.) part of a "feature" (e.g., a value of '2'); c.) part of a "feature" and within a threshold distance, e.g., two pixels, of a skin tone region (e.g., a value of '16'); or d.) neither within a skin tone region nor part of a "feature" (e.g., a value of '0'). The 0:1:2:16 weighting scheme described above is merely exemplary, but does illustrate that features occurring in or near skin tone regions can be deemed to be exponentially more important to the encoding of the video frame than macroblocks consisting only of skin tones or only of features. The determination of whether a given pixel is part of a "feature" can be based on any number of well known feature detection algorithms, such as the Viola Jones object detection framework, or any number of well known edge detection algorithms, such as Sobel edge detection.

The average of weighted pixel values for a given macroblock can then be calculated, and the macroblock can be given an overall "compression score," based on its calculated average weighted pixel value. Using a weighted average allows for the comparison of the relative importance of macroblocks of different sizes. The compression score can be based on, e.g., a scale of 1-10, with macroblocks having a compression score of 10 being compressed the least, and macroblocks with a score of 1 being compressed the most. Thus, the intelligent video compression scheme disclosed herein optimizes the distribution of compression rate for macroblocks over the video frame towards the areas of greatest interest for video conferencing, i.e., the face, hands, and, more particularly, facial features and the outer edges of faces. While this disclosure discusses a new technique for more intelligent video compression in videoconferencing applications, one of ordinary skill in the art would recognize that the techniques disclosed may also be applied to other contexts and applications as well.

The foregoing summary is not intended to summarize each potential embodiment or every aspect of the present disclosure.

DETAILED DESCRIPTION

Figure 1:
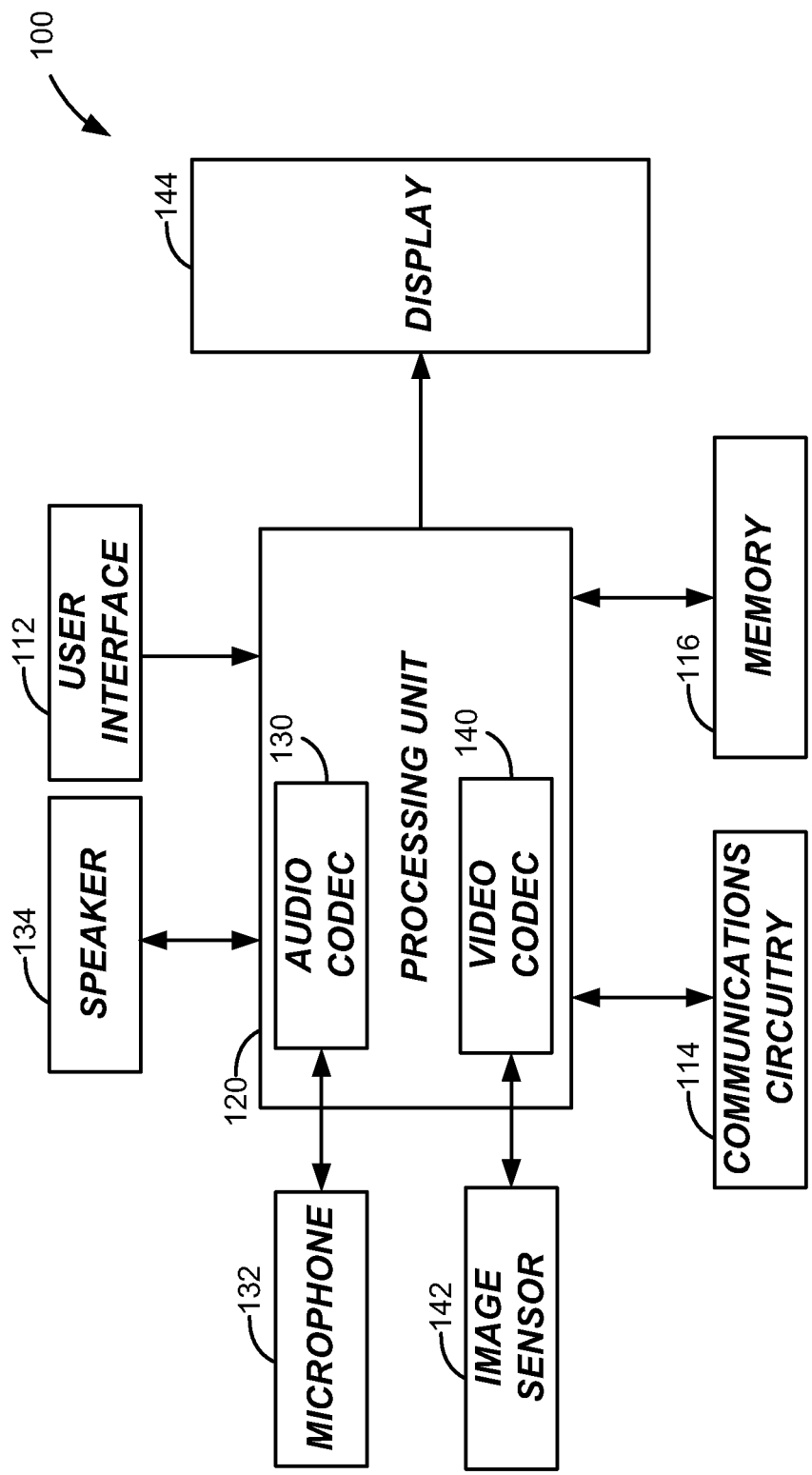
FIGS. 1-2 diagram a multimedia device according to one embodiment of the present disclosure.

A multimedia device 100 diagrammatically shown in FIG. 1 has a processing unit 120 programmed to carry out instructions for scoring and encoding video data according to the present disclosure. In this embodiment, the multimedia device 100 has an audio codec 130, a microphone 132, and speaker 134 for handling audio data during a video conference. Likewise, the multimedia device 100 has a video codec 140, an image sensor 142, and display 144 for handling video data during the video conference. Finally, the multimedia 100 device can include other components, including user interface 112, communications circuitry 114, memory 116, and others known in the art. Memory 116 is also one example of a computer readable medium wherein instructions for carrying out the intelligent video compression method may be stored (i.e., tangibly embodied), and it may consist of ROM, EEPROM, Flash memory, or any other suitable type of memory storage medium.

The techniques disclosed herein are applicable to any number of consumer electronic devices with digital image sensors. For example, the multimedia device 100 can be a digital camera, a digital video camera, a mobile phone, a personal data assistant (PDA), a portable music player, a computer, a video conferencing endpoint, or other device. For the present disclosure, the device 100 may be referred to as a mobile phone. As such, the disclosed video compression techniques can be useful for phones having front-facing cameras so a near-end speaker's face can be accurately presented on the front display of a far-end participant's phone and vice versa.

The image sensor 142 can be a conventional camera image sensor comprising a charge-coupled device (CCD) for taking video (and still images) and can be integrated into the multimedia device 100. The processing unit 120 can be an embedded processor, such a Cortex® A8 with the ARM® v7-A architecture, which provides a versatile and robust computing unit for carrying out the disclosed techniques. (CORTEX and ARM are registered trademarks of the ARM Limited Company of the United Kingdom.)

The video codec 140 receives video data output from the image sensor 142 and compresses the video data for sending over a communications network via the communications circuitry 114. To do this, the video codec 140 compresses the video data so it can be sent over the network in accordance with the network's bandwidth limitations.

Figure 2:
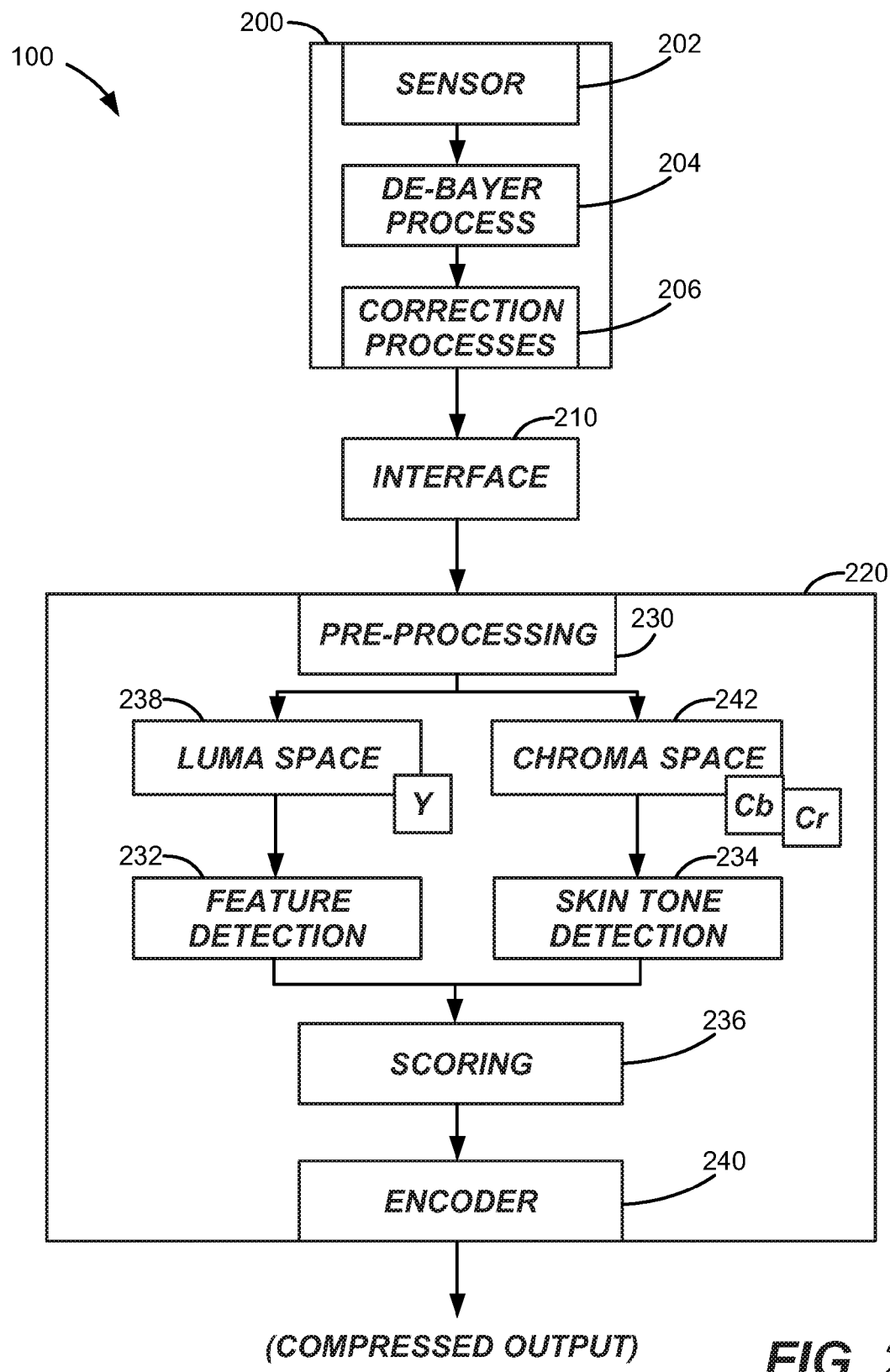

Given the above overview of the multimedia device 100 (FIG. 1), discussion now turns to additional details of the device. FIG. 2 shows a block diagram illustrating further details an image sensor package (ISP) 200 and processing components 220 for a processing unit of the multimedia device 100 of FIG. 1. To capture video data, the ISP 200 has a digital image sensor 202, which can be a CCD or the like. Depending on the type of sensor used, video data may be handled by a demosaicing or de-Bayering process 204, as is well known in the art. Also, various correction processes 206 may be performed. For example, lens correction may be done to correct the video data for various lens distortions including vignetting artifacts, i.e., light fall-off towards the edges of the frame, and color uniformity. An RGB contrast and saturation boost known in the art can shift the video data's midpoint color range, and a noise reduction filter can remove any noise caused by low light conditions or the like. Finally, the ISP 200 can encode the video data into the YCbCr color space and pass the encoded video data over an interface 210 for further processing.

As is known, a pixel in the YCbCr color space has a Y-component for luminance or brightness, a Cb-component for a "blue difference" chroma component (i.e., B-Y), and a Cr-component for a "red difference" chroma component (i.e., R-Y). The Cb and Cr components together are known as the "chroma space." Many digital cameras and digital video cameras for multimedia devices provide image data in the sub-sampled YCbCr color space to save memory bandwidth. For example, with so-called 4:2:0 sub-sampling, Cb and Cr are sampled at half the vertical and half the horizontal resolution of Y, resulting in one fourth the number of chroma samples as luma samples for a given region of an image. Although the processing of the video data is discussed herein using such a YCbCr color space, the teachings of the present disclosure can be used for any suitable color space and sampling.

From the interface 210, the encoded video data is then handled by additional processing components 220 of the multimedia device's processing unit. The components 220 include a pre-processing stage 230 having feature detection 232 in the luma space 238, skin tone detection 234 in the chroma space 242, and scoring 236. After pre-processing, an encoder 240 encodes the video data for sending over a communications network. Each of these components 220 is described in more detail later.

Given an understanding of the multimedia device 100 of FIGS. 1-2, discussion now turns to techniques disclosed herein for compressing video when limited bandwidth is available. As noted previously, the multimedia device 100 can be a mobile phone or other wireless portable device. When used for video conferencing, the more detail desired in the conference video requires more bits to be transmitted over the communications network. All of this is ultimately governed by the available bandwidth of the communications network being used for the video conferencing. The techniques of the present disclosure use both skin detection and feature detection to determine what portions of the video data are given more or less compression. In this way, the bandwidth available to the device 100, such as a mobile phone, can be better utilized to send useful video data to recipients.

Figure 3:
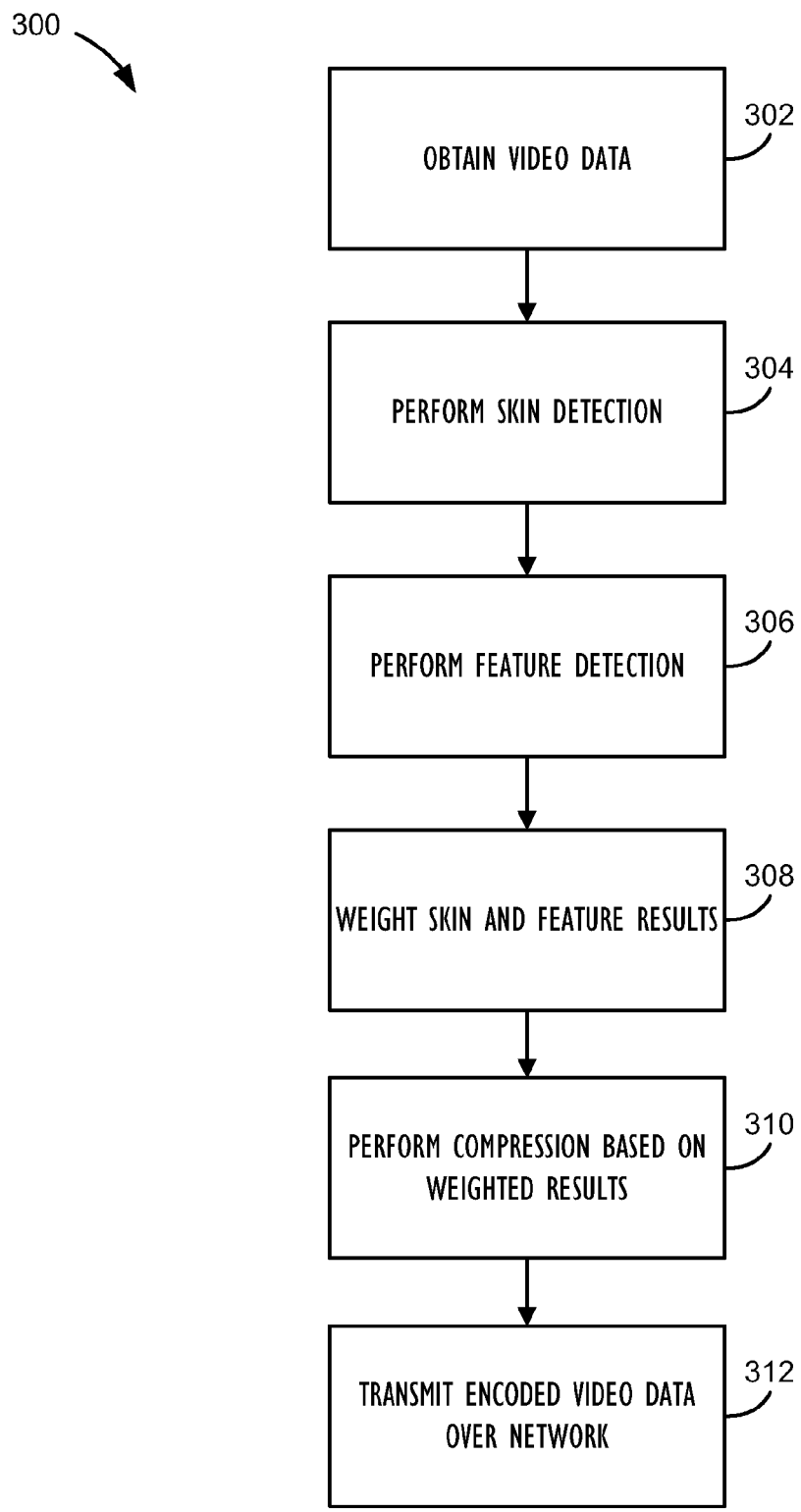
FIG. 3 shows a process for compressing video based on skin tone and feature detection according to one embodiment of the present disclosure.

Referring to FIG. 3, a process 300 for compressing video data for a video conference with the multimedia device 100 (FIGS. 1-2) is shown in flowchart form. Initially, the processing unit 120 of the multimedia device 100 obtains video data from the image sensor 142 (Block 302). The processing unit 120 performs skin tone detection on the (Block 304) as well as feature detection on the video data (Block 306). Note that the processing steps described in Block 304 and Block 306 may occur in any order or even simultaneously.

The pixel information used by the skin tone and feature detection processes depends on the color space of the video data. In one arrangement, the feature detection is done in the luma (Y) space, while the skin tone detection is done in the chroma space (Cb/Cr). In another embodiment, skin tone detection can be done directly in RGB space by simply comparing pixel color values to skin tone values directly. Skin or flesh tones may vary from person to person and may differ based on lighting conditions. Therefore, the skin tone detection may be configurable or adjustable as needed. Essentially, the processing unit 120 can determine which regions of the video data have pixel values falling within a range of skin or flesh tones using the skin tone detection. At the same time, prior to, or subsequently, the processing unit 120 can determine which regions of the video data have features. These features can include eyes, nose, mouth, ears, eye brows, hands, etc.

Knowing the locations of these two types of regions, the processing unit 120 can then weight or "score" the skin and feature results for the pixels in the various macroblocks making up the video data (Block 308). For example, a pixel in a region of skin tones will be given a higher weighting or importance than other pixels not in such a region. Similarly, a pixel in a region of a feature will likewise be given a higher weighting or importance than other pixels not in such a region. Finally, pixels that are in a feature and within or close to a skin tone region can be given the highest weighting or importance.

The act of weighting the skin and feature results can occur in the encoder of the video codec 140 and can operate as a pre-processing step that sends its information (i.e., "compression details") to the actual encoder. In turn, the encoder of the video codec 140 takes the "compression details" as indications or instructions for encoding different portions of a video frame and translating the compression details to actual rates at which it will compress each portion. In this way, the encoder of the video codec 140 in the processing unit 120 can decide how best to compress video data to retain detail.

From the pre-processing, the encoder of the processing unit's video codec 140 then performs compression of the regions based on the weighted results of the pixels (Block 310). A region having skin tones will then be encoded with more information (i.e., less compression) so such a region can be better recognized when decoded at a far-end video conferencing device. Also, a region having a feature will likewise be encoded with more information (i.e., less compression). Regions having a feature and within a threshold distance of a skin tone region will be encoded with the most information (i.e., the least compression). Other regions lacking skin tones and features will be encoded with less information (i.e., more compression). Once completed, the processing unit 120 transmits the encoded video data over a communication network using an appropriate protocol and the communications circuitry 114 (Block 312).

Figure 4:
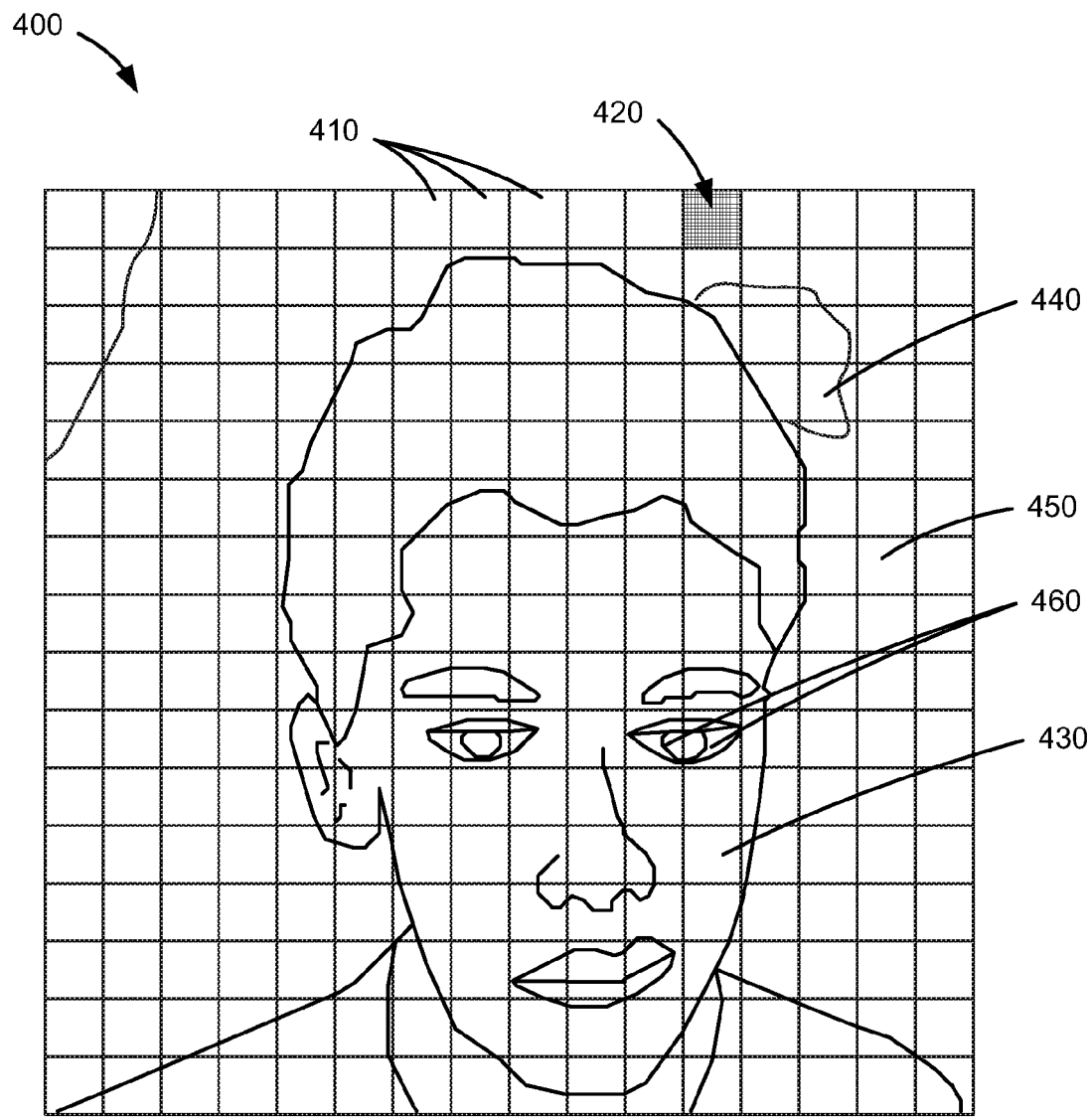
FIG. 4 shows a video frame divided into a plurality of macroblocks in accordance with one embodiment.

Before going into further detail of the processing involved, discussion first turns to how the video data is handled by the processing components 220. The video data comprises a sequence of frames 400—one of which is shown in FIG. 4. The frame 400 is divided into blocks 410 of pixels 420. These blocks 410 are referred to as macroblocks and are used for handling the video compression of the frame 400. Usually, the macroblocks 410 pixel widths and heights are based on multiples of four, but the actual size of a macroblock 410 depends on the codec used to encode the data.

In the present example shown in FIG. 4, the video frame 400 is 16 macroblocks 410 wide and 16 macroblocks 410 high, and each macroblock 410 is 16×16 pixels 420. Each pixel 420 in turn may have pixel information in the YCbCr color space, depending on the sub-sampling scheme employed. This makes for a video frame 400 with a pixel resolution of 256×256 pixels. Of course, the techniques of the present disclosure can apply to any other resolution, size of macroblock, or other arrangement. For example, an HVGA or "Half-size Video Graphics Array" could be twenty 16×16 pixel macroblocks in width and thirty 16×16 pixel macroblocks in height, for an overall resolution of 480×320 pixels.

As can be seen, some macroblocks (e.g., 430) contain pixel information of a subject's face and therefore have skin or facial tones. In general, a skin or facial tone as used herein can refer to any color value associated with the skin or face of a person. Since people are typically the most important subjects of a video conference, the disclosed techniques focus on skin or flesh tones.

As can also be seen, some macroblocks (e.g., 410) do not contain pixel information of the subject's face. These may or may not have skin tones. For example, macroblock 440 in the background may contain skin tones, whereas other macroblocks 450 may not. Still other macroblocks (e.g., 460) may not contain skin tones even though they lie within the subject's face. For example, the macroblocks 460 having regions of the subject's eyes, under the nose, etc. may be in shadow and not reflect skin tones in the captured video data. To determine how to compress the various macroblocks 410 in a complex video frame in a series of frames having a moving/changing subject, one embodiment of the video compression process disclosed herein uses both the skin tone detection and feature detection.

Figure 5:
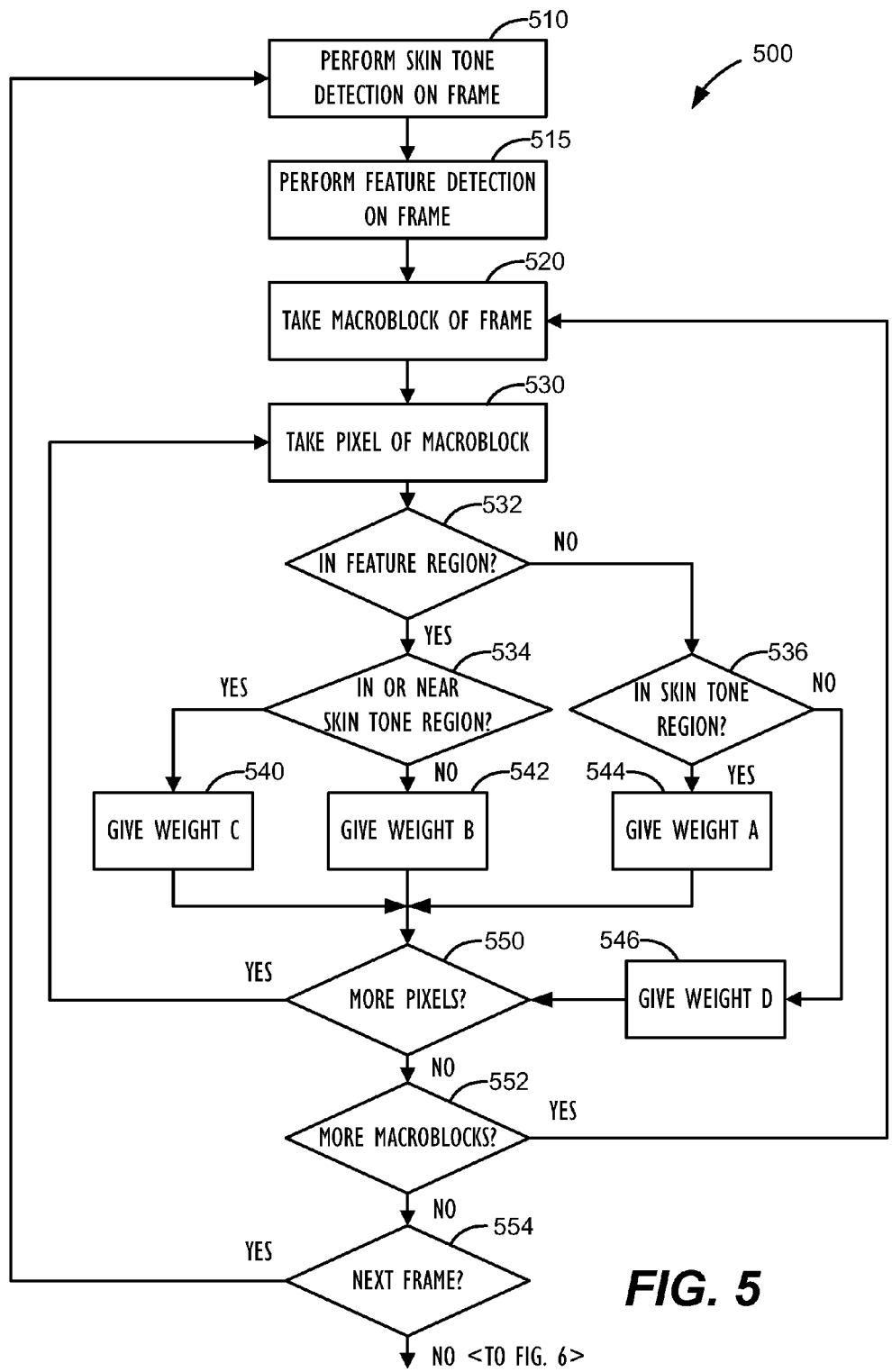
FIGS. 5-6 show a process for compressing video based on skin tone and feature detection in more detail and in accordance with one embodiment.
Figure 6:
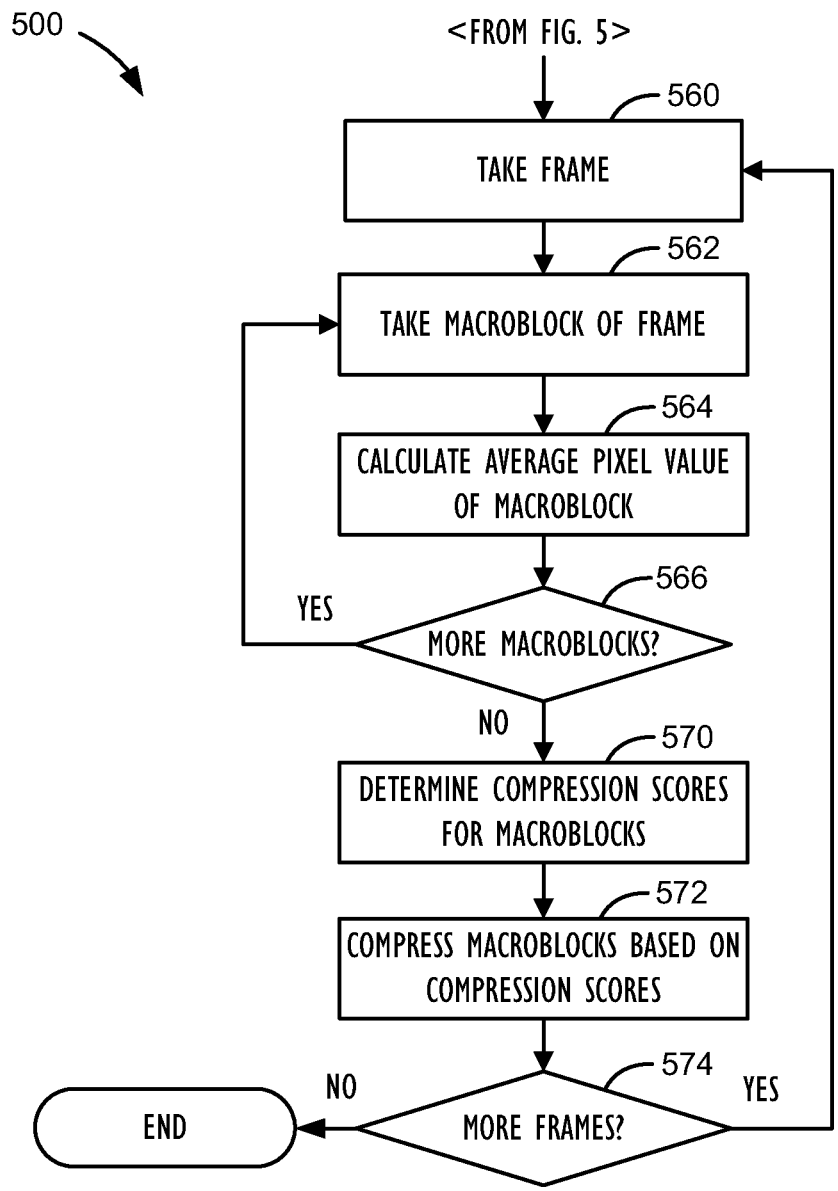

Turning to FIGS. 5-6, a detailed process 500 for video compression is described with concurrent reference to the components of FIG. 2. After the ISP (200) has captured video data and converted it into the YCbCr color space or the like, a skin tone detection process (234) of the preprocessing stages (230) performs skin tone detection on a frame of the video data (Block 510). This detection can be performed in a number of ways known in the art. Particular details of a preferred skin tone detection technique are disclosed in commonly-owned co-pending U.S. application Ser. No. 12/479,651 filed 5 Jun. 2009, which is incorporated herein by reference in its entirety.

Figure 8:
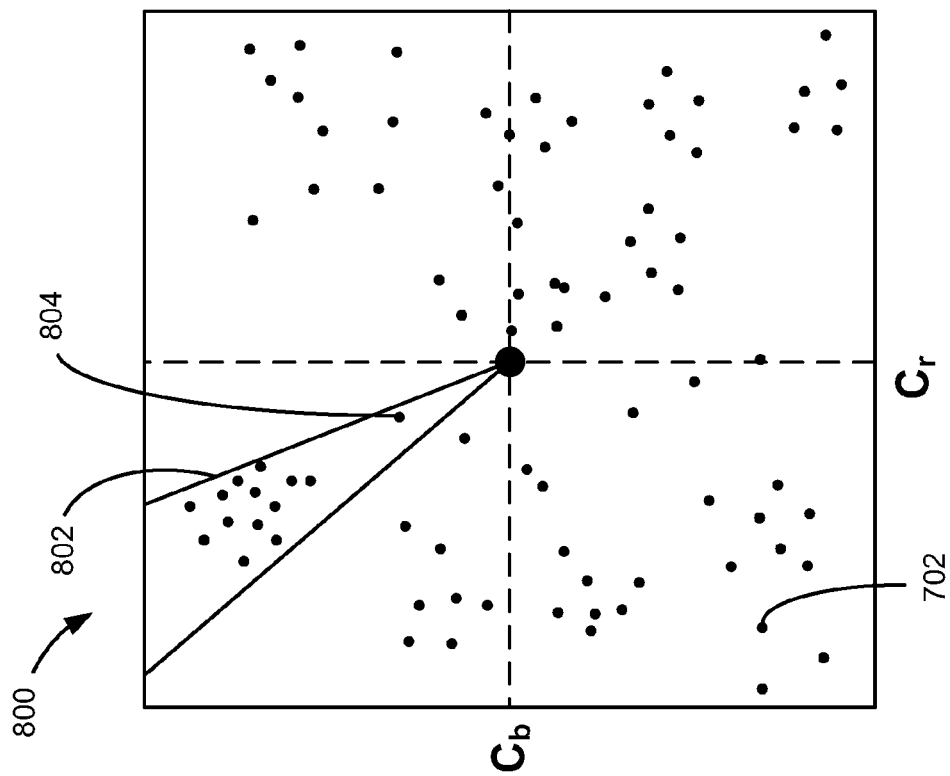
FIGS. 7-8 illustrate predetermined "skin-tone regions" in a chroma space in accordance with one embodiment.
Figure 7:
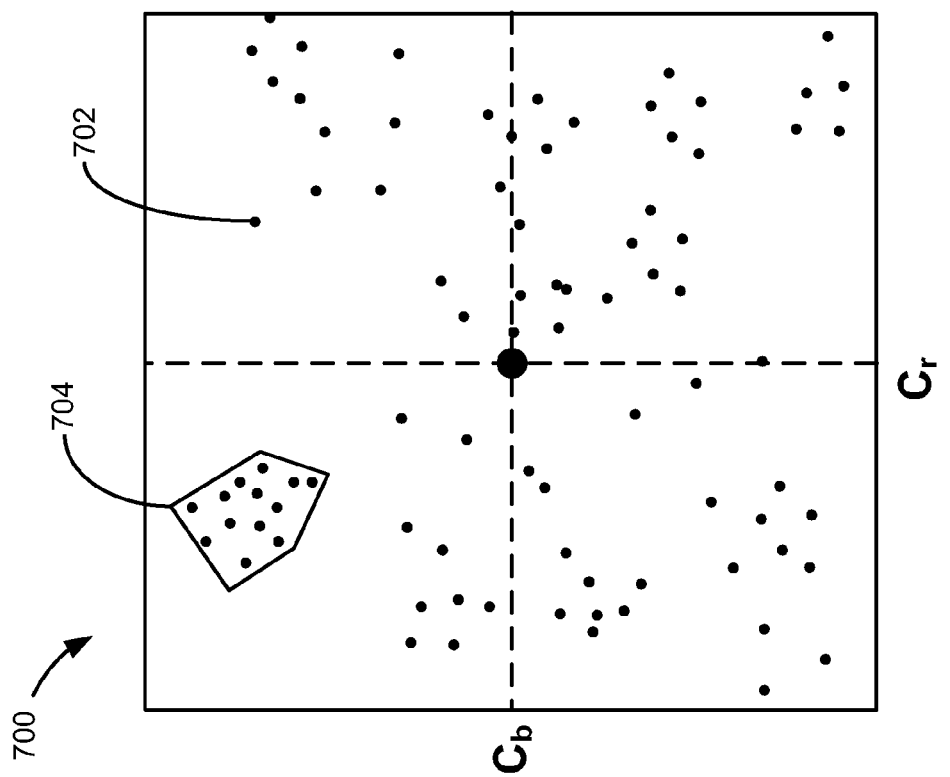

Briefly, the skin tone detection identifies areas of the video frame that have skin tones. To do this, the detection process determines regions in the frame having color values that fall within a predetermined "skin tone polygon" or "skin tone wedge" of a CbCr color space. FIGS. 7-8 shows chroma space maps 700 and 800 with a hypothetical array of points 702 representing pixels of a digital image. The points 702 are mapped relative to blue chrominance Cb and red chrominance Cr. Tonal values corresponding to skin tones may be predetermined, and the boundary parameters of such a "skintone" region may be programmed into the memory. In chroma map 700, a polygon 704 defines the skin tone region. Alternately, in chroma map 800, a "wedge" 802 emanating from the center of the map defines the skin tone region.

Each approach to chroma space skin tone region determination has its own advantages. For instance, the polygon approach is more accurate, but is more computationally expensive. The greater the number of sides in the region-defining polygon 704, the more computationally expensive it is to implement. On the other hand, the wedge 802 defining the skin tone region is less accurate and would consider a pixel 804 in the wedge 802 to be a skin tone, even though it possibly would not be a skin tone. Yet, the wedge 802 can be performed using vector processing and can be carried out very rapidly. Other techniques for defining the boundaries of skin tone regions could be used as well.

With the skin tone regions defined, the skin tone detection process (234) can make a skin tone decision for each pixel of the video frame based on the pixels' chrominance CbCr values. To do this, the chrominance values of sampled pixels in the frame can be examined via vector processing to determine whether the sampled values place the pixel inside or outside of the predetermined skin tone region. Each pixel of each macroblock can be examined and have a value representative of its skin tone determination (e.g., a binary determination of "skin tone" or "not skin tone") written to memory, e.g., memory 116. Alternatively, only some of the pixels of one or more of the macroblocks may be examined to improve processing speeds.

Returning to FIG. 5, a feature detection process (232) detects features or specific regions defined in the video data of the frame (Block 515). This detection can be performed before, during or after the skin tone detection and can also be performed in a number of ways known in the art. The determination of whether a given pixel is part of a "feature" can be based on any number of well-known feature or edge detection algorithms, such as Viola Jones object detection or Sobel edge detection. Each pixel of each macroblock can be examined and have a value representative of its feature determination (e.g., a binary determination of "feature" or "not feature") written to memory, e.g., memory 116. Alternatively, only some of the pixels of one or more of the macroblocks may be examined to improve processing speeds.

Figure 9:
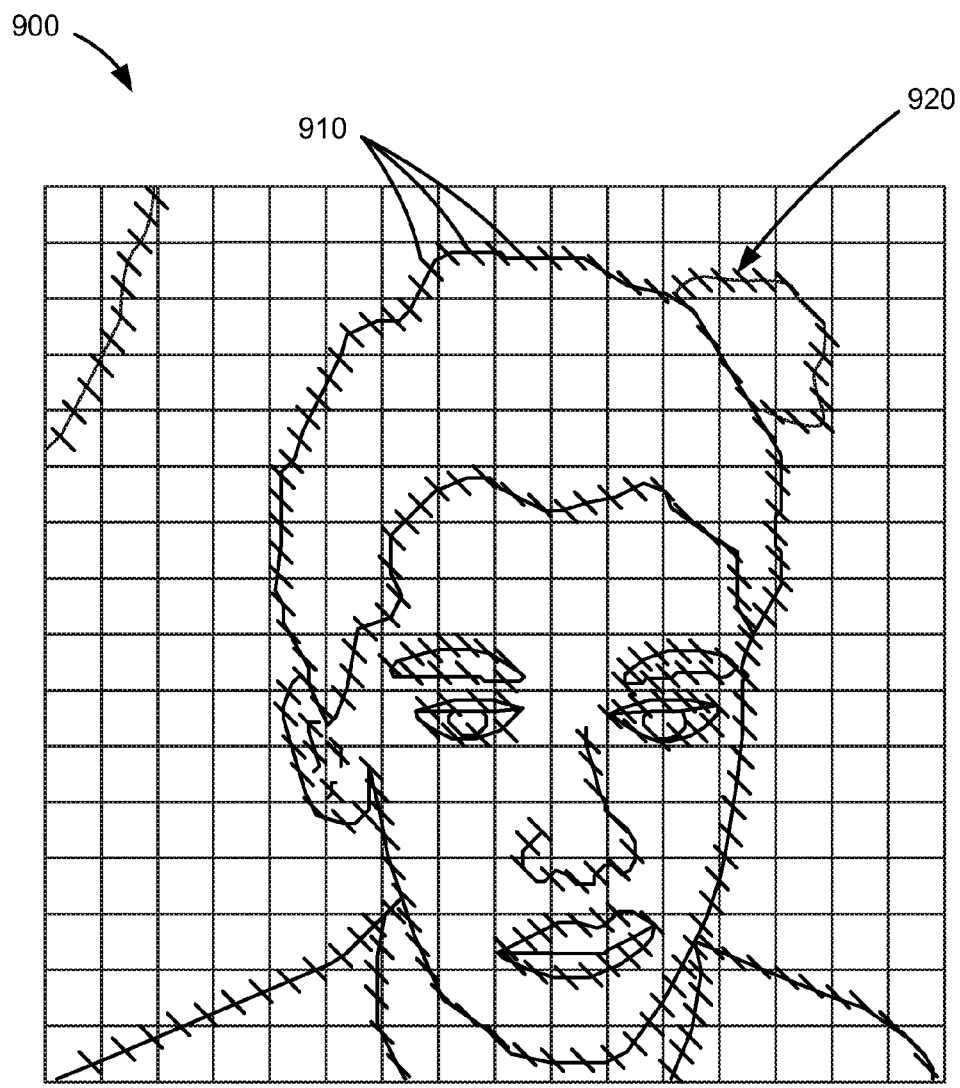
FIG. 9 shows the results of a hypothetical feature detection algorithm run over a group of macroblocks having various pixels in accordance with one embodiment.

Briefly, the feature detection process (232) identifies pixels within the frame that contain features or edges. To do this, the feature detection process may use pixel values in the luma (Y) space. For example, common edge detection algorithms attempt to identify points and directions in the digital image at which the image brightness (Y) values are changing the most drastically from pixel to pixel, or where the image has discontinuities. Edge detection may set any number of threshold parameters to determine where a given feature, i.e., edge, begins and ends within the digital image. As shown in FIG. 9, hypothetically located edges in digital image 900 are represented by hashed lines 910 on the image. Notice that a feature detection process is also likely to locate some edges or features 920 in background objects. It will be important for the method described herein to be able to distinguish between features 910 that are more important to video conferencing compression and features 920 that are less important to videoconferencing compression so that the bits comprising the video stream may be spent in the most important places.

Figure 10:
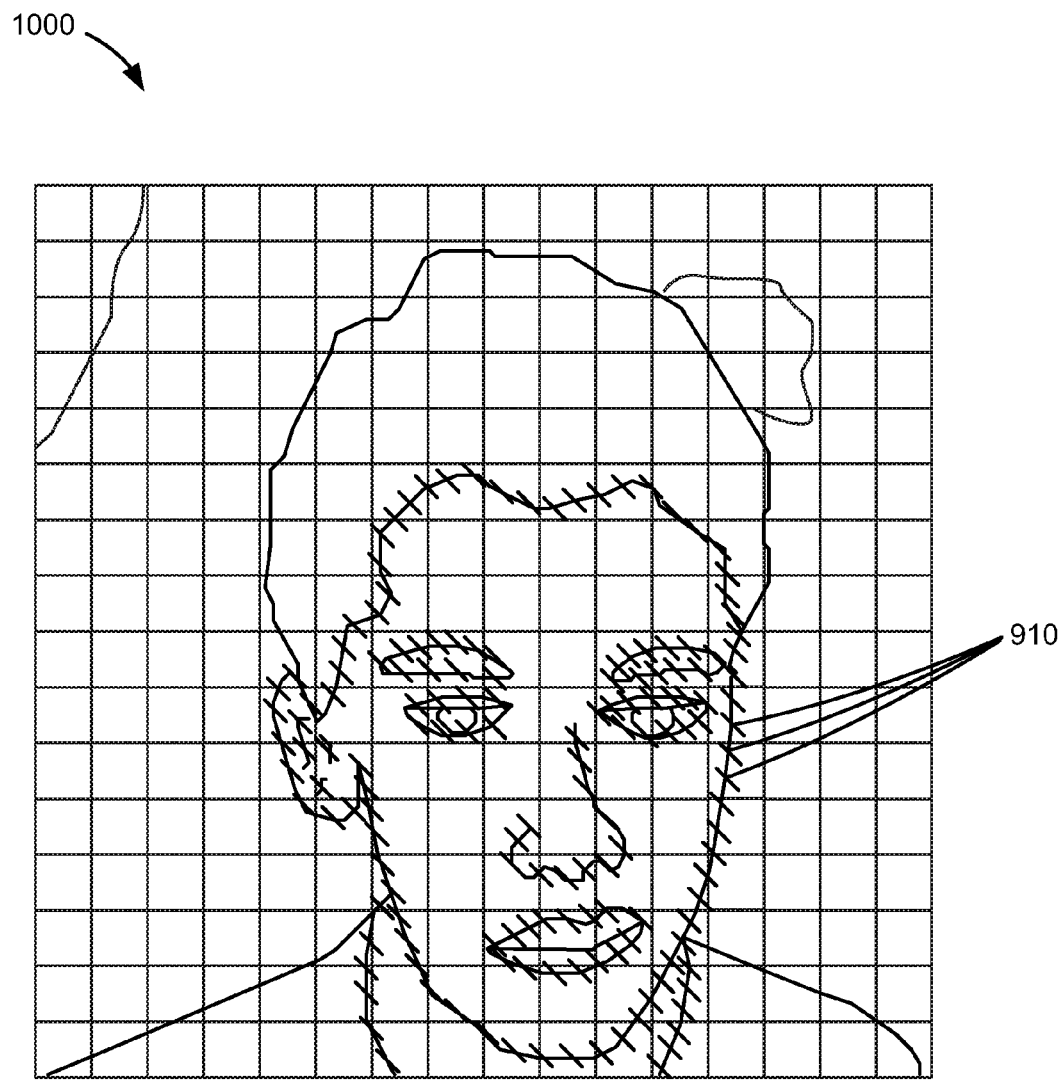
FIG. 10 shows the regions of a hypothetical image that are part of a feature and are also within a threshold distance of a skin tone region in accordance with one embodiment.

As shown in FIG. 10, the more important regions of the digital image 1000 for the purposes of videoconferencing, i.e., those regions of the image that are a part of a feature and are also within a threshold distance of a skin tone region, remain represented by hashed lines 910 on the image. The less important regions of digital image 1000, i.e., those regions of the image that contain no features or contain a feature that is not located within a threshold distance of a skin tone region, are no longer represented by hashed lines 910 on the image. The regions within digital image 1000 that remain represented by hashed lines 910 correspond with the macroblocks in the digital image 1000 that will be given the highest compression score and thus compressed at the lowest rate by the video encoder.

Returning to FIG. 5, once the skin tone and feature detection has occurred, a scoring process (236) can use both the detected skin tone regions and detected features to determine scores or weights that define how to compress the video data of the frame. First, a macroblock of the subject frame is selected (Block 520), and a pixel of the selected macroblock is examined (Block 530). The scoring processes (236) uses the stored skin tone and the feature determinations for each pixel to determine if the selected pixel is in a skin tone region only, in a feature region only, or in a feature region and within a threshold distance of a skin tone region (Decisions 532/534/ 536). Depending of the analysis, the scoring process (236) weights or scores the pixel accordingly (Blocks 540/542/544/ 546).

In one example, each pixel in a macroblock is given a weighted value based on whether the pixel is: a.) within a skin tone region (e.g., a value of '1'); b.) part of a "feature" (e.g., a value of '2'); c.) part of a "feature" and within a threshold distance, e.g., two pixels, of a skin tone region (e.g., a value of '16'); or d.) neither within a skin tone region nor part of a "feature" (e.g., a value of '0'). As mentioned above, the actual scoring system used can be configurable and can depend on the desired implementation and bandwidth constraints.

Finally, the process 500 determines whether there are more pixels, macroblocks, and then frames (Decisions 550/552/ 554). The process 500 can handle each frame of the video data or can handle only selected frames of the video data so that each frame does not need to be processed to determine the compression variables. In other words, one frame of video data may be handled by the process 500, and a number of subsequent frames can then use the same determination, assuming that the subject in the video conference is not changing position. This may or may not be useful in a given circumstance. Likewise, different macroblocks in different frames may be handled on an ongoing basis using the process 500 and the determination used for incoming frames.

Regardless of how macroblocks and frames are handled, the process 500 may continue as shown in FIG. 6. The scoring process (236) takes the subject frame to be compressed (Block 560) and takes a macroblock of the frame (Block 562). Using the previously determined scores of the pixels in a skin tone region only, in a feature only, or in a feature region and within a threshold distance of a skin tone region, the scoring process (236) calculates an average pixel value score for the macroblock.

After averaging each or some of the macroblocks of the frame (Decision 566), the scoring process (236) determines compression scores for the macroblocks (Block 570). To do this, the scoring process (236) calculates the compression score using the average pixel value for the given macroblock. In general, the compression score can be based on a predetermined scale (e.g., a scale of 1-10). In one embodiment, macroblocks having a compression score of 10 will be compressed the least by the video codec, while macroblocks with a score of 1 will be compressed the most by the video codec.

The compression scores may be determined by linearly scaling the averaged pixel values of each macroblock to a desired scale, e.g., 1-10. For example, the macroblock with the highest pixel average in a given video frame can be set with a highest compression score (e.g., '10'), and the rest of the macroblocks can be scaled relative thereto according to some appropriate function. Alternatively, the compression scores may simply be set to the averaged pixel values for the macroblock.

To save some additional bandwidth, if no macroblock reaches some threshold pixel average, then none of the macroblocks may be given a compression score of '10.' In this way, information will not be encoded with low compression just because it has the best or highest score in the current frame. This best-scored information in the current frame may not be of a videoconference participant, so that high compression may not be suitable or necessary. For example, the camera could be pointing at a white wall, in which case it would be appropriate and preferable to highly compress all macroblocks in the frame. However, an object (i.e., paper, exhibit, etc.) may actually be the intended subject of the current frame of the videoconference, so that this feature may be implemented optionally and/or configurable.

Once the compression scores for the desired macroblocks are determined, the encoder (240) then compresses the macroblocks based on the compression scores (Block 572) and continues on to the next frame (Decision 574). The compression scores may, for example, be passed to the encoder in the form of an attachment to the video frame. Regions of the frame with less useful information are more compressed than regions with more useful information (i.e., skin tones and features). Thus, the method optimizes the distribution of compression rate for macroblocks over the video frame towards the areas of greatest interest for video conferencing—i.e., the face, hands, and, more particularly, facial features. The encoder 240 can use any suitable standard format for compressing videoconference video. Some standards include H.263 and H.264 video codec standard.

Situations may occur in the video during the conference where portions of a video frame are compressed more or less than they "should" be, based on their actual importance to the video image. These portions or "outlier macroblocks" may occur because, e.g., part of a subject's face falling within a particular macroblock(s) are located in shadows such that the macroblock(s) are compressed more than the surrounding macroblocks because the method was unable to determine that the shadowy region was a skin tone and/or part of a feature. This would result in the given macroblock(s) being a False Negative. The opposite situation may be referred to as a False Positive, that is, a situation where a macroblock(s) is less compressed than its surrounding macroblocks because some lighting condition, edge effect, or combination of the two makes it appear to the scoring process as though the macroblock(s) is more important to the video frame than it really is. For example, trees or plants in the background of an image may have regions with many edges and/or be close enough to skin tones that they get very high compression scores even though such a determination is either not accurate or not beneficial to the overall compression scheme.

Figure 11:
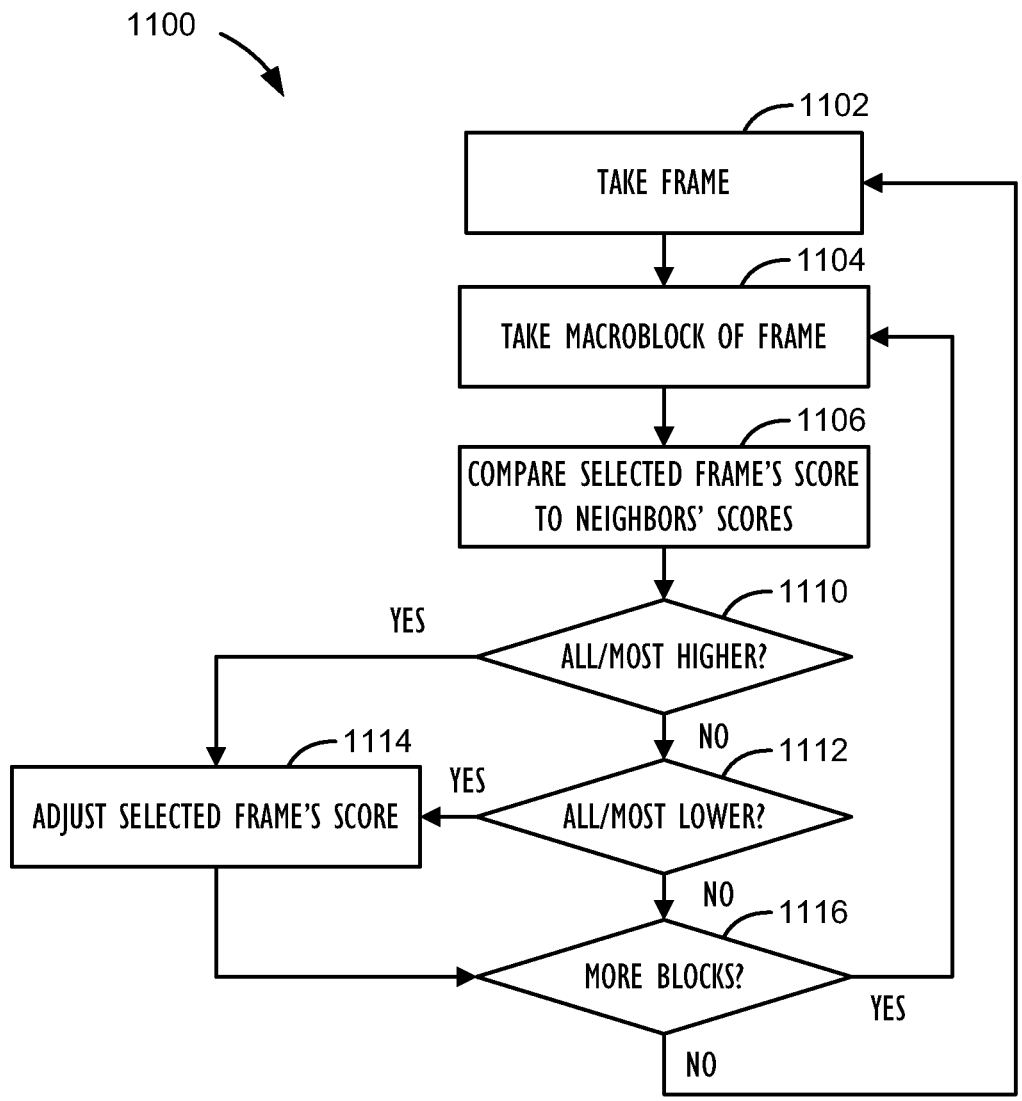
FIG. 11 shows a process for adjusting compression scores of a processed frame in accordance with one embodiment.

To deal with these situations, a second pass can be made through the macroblocks of a processed frame after each macroblock has already been given an initial compression score. As shown in FIG. 11, this continued process 1100 takes an already processed frame (Block 1102) and selects a macroblock (Block 1104). The process 1100 then compares the selected macroblock's compression score to the scores of its neighboring macroblocks (Block 1106). This is done to find outliers, such as a low compression macroblock surrounded by high compression macroblocks (i.e., False Positive) or a high compression macroblock surrounded by all low compression macroblock (i.e., False Negative).

Figure 12:
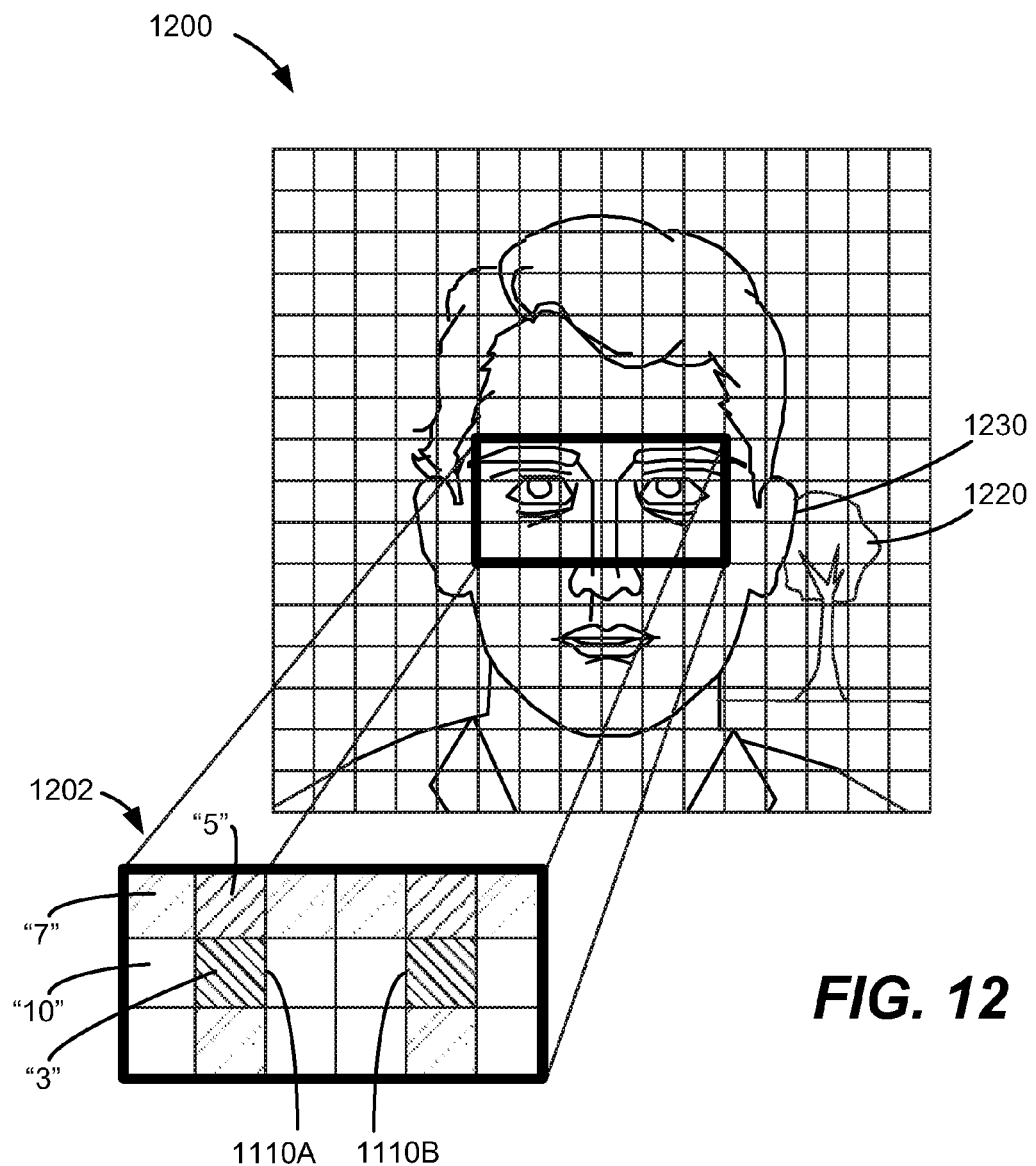
FIG. 12 shows a video frame having macroblock outliers in accordance with one embodiment.

For example, FIG. 12 shows a video frame 1200 of a subject with a set 1202 of macroblocks isolated from around the subject's eyes lying in deep shadow. Central macroblocks 1210A-B represent False Negatives. These macroblocks 1210A-B have low scores (e.g., "3") compared to the scores (e.g., "5," "7," & "10") of its surrounding neighbors (i.e., eight adjacent macroblocks). The low scored macroblocks 1210A-B will be compressed more than their neighbors even though these macroblocks 1210A-B include pixels representative of the subject's eyes, i.e., an important region of the video frame for the purposes of videoconferencing. Presumably, the discrepancy in scores has resulted from deep shadows, color differences, unreliable edge detection, etc. Whatever the reason, compressing the eyes more than the surrounding brow and cheeks of the subject would be less than ideal. For this reason, the second pass of the disclosed process is used to detect such outliers and correct them.

A False Positive could occur in the frame 1200 for a number of reasons. For example, the frame 1200 may contain woods or trees in the background, and there may or may not be many features and edges from the detail in the branches and leaves. In addition, the color may be close enough to skin tone that a given macroblock 1220 may be scored to result in relatively low compression rates. For example, the given macroblock 1220 may be scored similar to another macroblock 1230 actually containing portions of the subject's face. If this compression scoring were used, the macroblock 1220 would be given more importance than necessary. By looking at the scores of surrounding macroblocks, the score for the given macroblock can be adjusted intelligently.

Returning to FIG. 11, the continuing process 1100 compares the selected macroblock's compression score to the scores of its neighboring macroblocks (Block 1106). The selection of which and how many neighboring macroblocks to compare with the selected macroblock can depend on the circumstances, the discrepancies between scores, and may be configurable. If most, all, or some level of the neighboring scores are higher than the selected macroblock's score, then the process 1100 determines this macroblock to be a False Negative outlier (Decision 1110), and the process 1000 adjusts the selected macroblock's score to reflect that of its neighbors (Block 1114). Alternatively, if most, all, or some level of the neighboring scores are lower than the selected macroblock's score, then the process 1100 determines this macroblock to be a False Positive outlier (Decision 1112), and the process 1100 adjusts the selected macroblock's score to reflect that of its neighbors (Block 1114). Eventually, the process 1100 selects each macroblock (or some select set thereof) (Decision 1116) before going to the next or some subsequent video frame (Block 1102).

In one embodiment, a False Positive/False Negative outlier score correction process may be carried out over desired macroblocks. The process may define one threshold value for False Negative macroblocks, e.g., "5." The process may then examine the compression scores for each neighboring macroblock of a selected macroblock. If the average compression score for the selected macroblock's neighboring macroblocks is equal to or greater than the False Negative threshold, e.g., "5," and the selected macroblock's score is less than the False Negative threshold, the process may then set the compression score for the selected macroblock to be the average compression score of the selected macroblock's neighboring macroblocks. Likewise, the correction process may define another threshold value for False Positive macroblocks, e.g., "2." The process may then examine the compression scores for each neighboring macroblock of a selected macroblock. If the average compression score for the selected macroblock's neighboring macroblocks is equal to or less than the False Positive threshold, e.g., "2," and the selected macroblock's score is greater than the False Positive threshold, the process may then set the compression score for the selected macroblock to be the average compression score of the selected macroblock's neighboring macroblocks. The values used for the False Positive and False Negative thresholds could of course be adjusted for more or less aggressive handling of False Positive/False Negative outlier macroblocks, as is desired. The False Positive threshold of, e.g., "2," is chosen to ensure that noise in the background of the image does not interfere with the False Positive removal. On the other hand, if the macroblock has a higher compression score of at least, e.g., "5," it can be assumed that the macroblock possesses a sufficient amount of skin tone pixels that it is in an area of skin.

As mentioned above, in adjusting the selected macroblock's score (Block 1114), the process 1100 can take an average of the neighboring macroblocks' scores and assign the selected macroblock to have the average score. Alternatively, the process could use some other preset score if desired. Scores of the neighboring macroblocks could also be weighted based on proximity to the selected macroblock and based on the disparity between the scores. Some other determination could also be performed. Ultimately, the process 1100 in this second pass determines if a selected macroblock is a False Negative or False Positive outlier that should have its compression score corrected.

The intelligent skin tone and facial feature aware videoconferencing compression method described herein may also have some applications in non-videoconferencing applications, such as surveillance cameras. Surveillance systems store very large amounts of data over long amounts of time, and thus, it may be desirable to compress faces of people (e.g., a bank surveillance camera) at a lower rate than walls and other background objects.

The foregoing description of preferred and other embodiments is not intended to limit or restrict the scope or applicability of the inventive concepts conceived of by the Applicant. In exchange for disclosing the inventive concepts contained herein, the Applicant desires all patent rights afforded by the appended claims. Therefore, it is intended that the appended claims include all modifications and alterations to the full extent that they come within the scope of the following claims or the equivalents thereof.

What is claimed is:

1. A processor programmed to perform a video compression method, the method comprising:
    determining with the processor any first pixels in a frame having color in a predetermined tone region;
    determining with the processor any second pixels in the frame that are part of at least one facial feature;
    for each pixel in the frame:
        assigning a first value to the respective pixel if a location of the pixel is within a specified threshold distance to any of the first pixels, but the pixel is not one of the second pixels;
        assigning a second value to the respective pixel if the pixel is one of the second pixels but is not located within a specified threshold distance to any of the first pixels;
        assigning a third value to the respective pixel if the location of the pixel is within a specified threshold distance to any first pixel and the pixel is a second pixel;
        assigning a fourth value to the respective pixel if the pixel is not located within a specified threshold distance to any first pixel and not one of the second pixels;
    averaging the assigned pixel values on a block by block basis within the frame to generate respective block scores;
    compressing with the processor the video frame using coding parameters selected based on the block scores.

2. The processor of claim 1, wherein determining the first pixels comprises comparing each pixel's color to a polygonal tone region.

3. The processor of claim 2, wherein the predetermined tone region comprises CbCr values indicative of human skin tones.

4. The processor of claim 2, wherein the predetermined tone region comprises RGB values indicative of human skin tones.

5. The processor of claim 1, wherein determining the second pixels comprises carrying out an edge detection process on the pixels in the frame.

6. The processor of claim 1, wherein determining the second pixels comprises carrying out a feature detection process on the pixels in the luma space.

7. The processor of claim 1, wherein the first, second, third and fourth values are all different values from each other.

8. The processor of claim 1, wherein the second value is higher than the first value.

9. The processor of claim 8, wherein the third value is higher than the second value.

10. The processor of claim 9, wherein the first value is higher than the fourth value.

11. The processor of claim 1, wherein compressing the blocks comprises:
    comparing the score of a block to the scores of one or more neighboring blocks; and
    adjusting the score of the given block based on a difference between the scores of the respective block and its neighbor(s).

12. The processor of claim 10, wherein compressing the frame comprises compressing the blocks having a higher score with less compression than the blocks having a lower score.

13. The processor of claim 1, wherein compressing the blocks comprises:
    comparing the score of a given one of the blocks to the scores of one or more neighboring blocks; and
    adjusting the score of the given block based on a discrepancy.

14. The processor of claim 13, wherein the discrepancy is indicative of the given block having a lower or higher score compared to the one or more neighboring blocks.

15. The processor of claim 1, wherein each of the blocks comprises a macroblock.

16. The processor of claim 1, wherein compressing the regions comprises:
    adjusting the score for each block having a score that differs from the score of one or more neighboring blocks by more than a threshold value to be equal to the average score of the neighboring blocks.

17. A non-transitory storage medium having a computer readable program code embodied therein, wherein the computer readable program code is adapted to be executed to implement the method performed by the programmed processor of claim 1.

18. An apparatus, comprising:
    an image sensor for obtaining video data;
    memory operatively coupled to the image sensor; and
    a processor operatively coupled to the memory and the image sensor and programmed to encode the video data, the processor configured to:
        determine any first pixels in a frame having color in a predetermined tone region;
        determine any second pixels in the frame that are part of at least one facial feature;
        for each pixel in the frame:

assign a first value to the respective pixel if a location of the pixel is within a specified threshold distance to any one of the first pixels, but the pixel is not one of the second pixels;

assign a second value to the respective pixel if the pixel is one of the second pixels but is not located within a specified threshold distance to any of the first pixels;

assign a third value to the respective pixel if the location of the pixel is within a specified threshold distance to any first pixel and the pixel is a second pixel;

assign a fourth value to the respective pixel if the pixel is not located within a specified threshold distance to any first pixel and not one of the second pixels;

average the assigned pixel values on a block by block basis within the frame to generate respective block scores; and compress the video frame using coding parameters based at least in part on the block scores.

19. The apparatus of claim 18, wherein the apparatus comprises at least one of the following: a digital camera, digital video camera, mobile phone, personal data assistant, portable music player, and computer.

20. The apparatus of claim 18, wherein the second value is higher than the first value.

21. The apparatus of claim 20, wherein the third value is higher than the second value.

22. The apparatus of claim 21, wherein the first value is higher than the fourth value.

23. The apparatus of claim 21, wherein the processor is further configured to:

compare the score of a given one of the blocks to the scores of one or more neighboring blocks;

adjust the score of the given block based on a discrepancy between the scores; and adjust the coding parameters based on the new scores.

24. The apparatus of claim 22, wherein the processor is further configured to:

compress the blocks having a higher score with a higher bit rate than the blocks having a lower score.

25. The processor of claim 1, wherein the processor is further configured to:

determine if the pixel is within a specified threshold distance to any first pixel by comparing the location of that respective pixel with the location of any first pixel.

* * * * *